United States Patent
Kocurek et al.

(10) Patent No.: US 9,786,975 B2
(45) Date of Patent: Oct. 10, 2017

(54) TRANSMISSION LINE FORMED OF PRINTED SELF-SUPPORTING METALLIC MATERIAL

(71) Applicant: Raytheon Company, Waltham, MA (US)

(72) Inventors: Patrick J. Kocurek, Allen, TX (US); Daniel Schlieter, Richardson, TX (US); Christopher Loehrlein, Plano, TX (US); Brandon W. Pillans, Plano, TX (US); Richard G. Pierce, Richardson, TX (US)

(73) Assignee: RAYTHEON COMPANY, Waltham, MA (US)

( * ) Notice: Subject to any disclaimer, the term of this patent is extended or adjusted under 35 U.S.C. 154(b) by 113 days.

(21) Appl. No.: 14/817,891

(22) Filed: Aug. 4, 2015

(65) Prior Publication Data

US 2017/0040657 A1    Feb. 9, 2017

(51) Int. Cl.
| | |
|---|---|
| *H01P 3/06* | (2006.01) |
| *H01P 3/08* | (2006.01) |
| *B29C 67/00* | (2017.01) |
| *H01P 11/00* | (2006.01) |
| *B33Y 70/00* | (2015.01) |

(52) U.S. Cl.
CPC ............ *H01P 3/06* (2013.01); *B29C 67/0055* (2013.01); *B33Y 70/00* (2014.12); *H01P 3/081* (2013.01); *H01P 3/087* (2013.01); *H01P 11/003* (2013.01); *H01P 11/005* (2013.01)

(58) Field of Classification Search
CPC .... H01P 3/06; H01P 3/08; H01P 3/085; H01P 3/087; H01P 11/005; H01P 11/003
USPC .................................................. 333/238, 243
See application file for complete search history.

(56) References Cited

U.S. PATENT DOCUMENTS

| | | | |
|---|---|---|---|
| 5,017,509 A | 5/1991 | Tuckerman | |
| 5,442,131 A | 8/1995 | Borgwarth | |
| 6,441,697 B1 | 8/2002 | Garland | |
| 6,917,262 B2 | 7/2005 | Poire | |
| 7,015,569 B1* | 3/2006 | Tetelbaum | H01L 23/5225 257/659 |
| 8,742,874 B2 | 6/2014 | Sherrer | |
| 8,814,601 B1 | 8/2014 | Sherrer | |
| 8,866,300 B1 | 10/2014 | Sherrer | |
| 2001/0040274 A1* | 11/2001 | Hidaka | H01L 23/552 257/659 |

(Continued)

FOREIGN PATENT DOCUMENTS

WO    2014153535 A2    9/2014

OTHER PUBLICATIONS

ISR/WO, Issued Aug. 29, 2016, RAY0307PCT, PCT Application No. PCT/US16/34936.

(Continued)

*Primary Examiner* — Benny Lee
(74) *Attorney, Agent, or Firm* — Cantor Colburn LLP (57) ABSTRACT

A transmission line is provided and includes a center conductor suspended above a ground plane and comprising a line of printed, self-supporting metallic material, ground walls disposed on either side of the center conductor and comprising stacked lines of printed metallic material and a lid suspended above the center conductor between the ground walls and comprising arrayed lines of the printed, self-supporting metallic material.

20 Claims, 4 Drawing Sheets

(56) References Cited

U.S. PATENT DOCUMENTS

2009/0251232 A1* 10/2009 Ding et al. .............. H01P 3/003
333/1
2014/0159836 A1   6/2014 O'Neil et al.
2014/0231266 A1   8/2014 Sherrer et al.
2015/0054201 A1   2/2015 Kim et al.

OTHER PUBLICATIONS

Air-Gap Transmission Lines on Printed Circuit Boards for Chip-To-Chip Interconnections, Todd Joseph Spencer, Georgia Institute of Technology, May 2010; 210 pages.

* cited by examiner

FIG. 8

TRANSMISSION LINE FORMED OF PRINTED SELF-SUPPORTING METALLIC MATERIAL

BACKGROUND

The present invention relates to a 3D printed transmission line assembly and, more specifically, to a 3D printed radio frequency (RF) transmission line assembly.

High RF loss from conventional transmission lines, such as microstrip transmission lines, striplines and coplanar waveguide (CPW) transmission lines, leads to limits on RF power that can be transmitted along conventional transmission lines. This is especially true for those transmission lines used for the transmission of high frequency signals. Due to the RF losses, conventional transmission lines must be spaced relatively far apart to ensure RF isolation from one line to another. This spacing requirement results in RF crossover assemblies requiring expensive, multilayer boards.

With the above in mind, it is seen that large scale broadband performance is often limited by the use of conventional transmission lines. As an attempt to address the problems associated with conventional transmission lines, a polystrata process was proposed and demonstrated high-isolation RF crossovers with very low loss. However, since the process relies upon subtractive manufacturing with many operational steps, the process is prohibitively expensive and difficult to integrate into some RF products.

SUMMARY OF THE INVENTION

According to one embodiment of the present invention, a transmission line is provided and includes a center conductor suspended above a ground plane and comprising a line of printed, self-supporting metallic material, ground walls disposed on either side of the center conductor and comprising stacked lines of printed metallic material and a lid suspended above the center conductor between the ground walls and comprising arrayed lines of the printed, self-supporting metallic material.

According to another embodiment of the present invention, a transmission line formation method is provided and includes suspending a first line of self-supporting metallic material (SSMM) above a ground plane, laying first and second lines of grounded metallic material (GMM) along the ground plane on either side of the first line, forming ground walls by laying additional lines of metallic material (AMM) on the first and second lines of the GMM and on previously laid lines of the AMM and forming a lid by suspending second lines of the SSMM above a plane of the first line of the SSMM.

According to another embodiment of the present invention, a transmission line formation method is provided and includes printing a first line of self-supporting metallic material (SSMM) above a ground plane between first and second removable supports, printing first and second lines of grounded metallic material (GMM) along the ground plane on either side of the first line of the SSMM, sequentially forming ground walls by printing lines of additional metallic material (AMM) on the first and second lines of the GMM and on previously printed lines of the AMM in a stacking direction and sequentially forming a lid by printing second lines of the SSMM above a plane of the first line of the SSMM between respective uppermost lines of the AMM of the ground walls.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION OF THE INVENTION

As will be described below, additive manufacturing is employed to enable the 3D printing of printed air microstrip or air-coax transmission lines directly into radio frequency (RF) products. Using a printer (e.g., a micro-dispenser), nano-silver paste is printed to form a rectangular coax or "rectax" RF transmission line with the center conductor suspended in air above the ground plane and spanning between RF transitions at each end. By stacking lines of silver paste material, ground walls can be formed on the left and right of the center conductor. By spanning across those walls with the same paste material, a lid can be formed to completely surround the center conductor for maximum RF isolation with minimal dispersion and low RF loss.

With reference now to FIGS. 1, 1A, 2, 3, 4, 5 and 6, a transmission line assembly 10 (see FIGS. 1 and 1A) is provided and may be disposed on a ground plane surface 11 (see FIGS. 1, 1A, 2, 3, 5 and 6). The transmission line assembly 10 includes a first transition pad 20 (see FIGS. 2 and 6) disposed to protrude upwardly from the ground plane surface 11, a second transition pad 30 (see FIGS. 1, 2 and 6) disposed to protrude upwardly from the ground plane surface 11 at a distance (e.g., about 50-100 mils) from the first transition pad 20 and a center conductor 40 (see FIGS. 1, 1A, 2, 5 and 6). The first transition pad 20 may be formed of dielectric materials and includes a first uppermost surface 21 (see FIG. 2) that may have a conductive element disposed thereon and the second transition pad 30 similarly may be formed of dielectric materials and includes a second uppermost surface 31 (see FIG. 2) that may have a conductive element disposed thereon.

Figure 1:
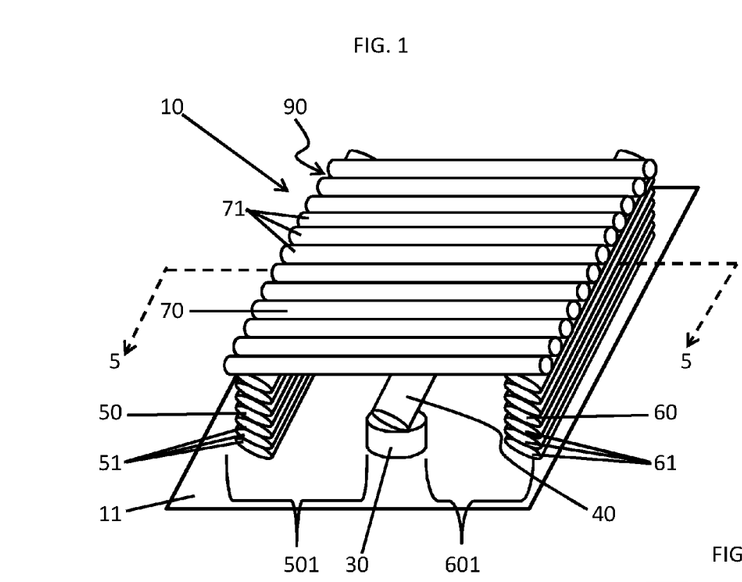
FIG. 1 is a perspective view of a transmission line assembly in accordance with embodiments.
Figure 1A:
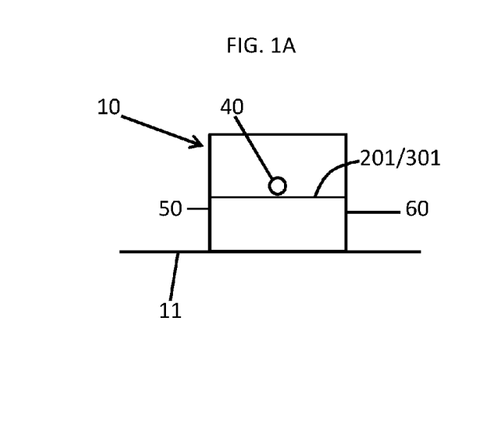
FIG. 1A is an axial view of the transmission line assembly of FIG. 1 in accordance with alternative embodiments.

The first and second transition pads 20 and 30 may each be formed by way of fused deposition modeling or another similar three-dimensional or additive manufacturing method. As shown in FIG. 1A, however, and in accordance with alternative embodiments, the first and second transition pads 20 and 30 may be replaced by dielectric straps 201/301 that extend horizontally across the ground cage of the transmission line assembly 10. The dielectric straps 201/301 provide for a minimum amount of support for the center conductor 40 and may provide for lower losses as compared to the first and second transition pads 20 and 30 due to reduced dielectric material near the center conductor 40. Hereinafter the terms "transition pads", "straps", "posts" and "supports" will be used interchangeable to refer to any dielectric structures that serve to support the center conductor 40. In each and every case, the transition pads/straps, posts and supports are removable especially once the center conductor 40 is sintered or cured.

The center conductor 40 extends between the first and second transition pads 20 and 30 from the first uppermost surface 21 to the second uppermost surface 31 and may, in some cases, extend beyond the first and second transition pads 20 and 30. In some other cases, one of the first and second transition pads 20 and 30 may be discarded with the center conductor 40 disposed on the remaining pad. In still other cases, the center conductor 40 may be self-supported or disposed on another structural feature besides the first and the second transition pads 20 and 30. For purposes of clarity and brevity, however, the following description will relate to the case in which the center conductor 40 extends between the first and second transition pads 20 and 30.

In any case, the center conductor 40 is suspended above the ground plane surface 11. The suspension of the center conductor 40 is facilitated by the center conductor 40 being formed as a wire, a ribbon or, more generally, as a line 41 (see FIGS. 2, 5 and 6) of printed, self-supporting metallic paste material. That is, where the first and second transition pads 20 and 30 are used, the center conductor 40 may be formed by a three-dimensional printing or additive manufacturing method whereby the metallic material is printed in small quantities from a suitable printing nozzle 42 (see FIGS. 2, 3 and 4) while moving from the first transition pad 20 to the second transition pad 30. In accordance with embodiments, the nozzle 42 may be formed with tight tolerances to dispense the line 41 with a 5 mil±10% width.

Figure 2:
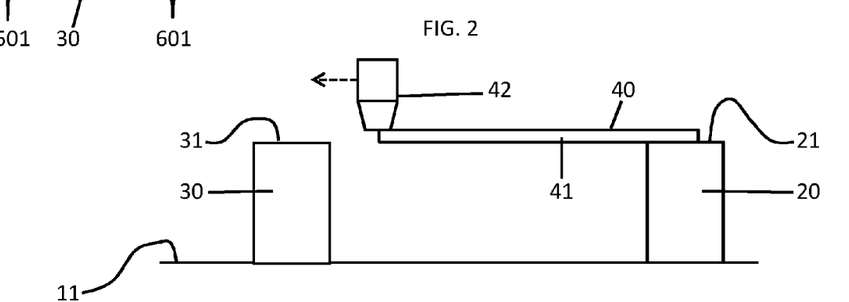
FIG. 2 is a side schematic illustration of a printing of metallic material in accordance with embodiments.

In accordance with embodiments, the metallic material may be formed of silver and/or silver alloys. With such composition, as the metallic material is printed by the nozzle 42 onto the first transition pad 20 and the nozzle 42 continues the dispensation while moving toward the second transition pad 30, as shown in FIG. 2, the metallic material remains suspended above the ground plane surface 11 due to the unique, self-supporting characteristics of the metallic material. In accordance with further embodiments, the center conductor 40 may be formed of any self-suspending or self-supporting metallic material, any non-self-supporting material that is cured, sintered or dried in-situ (e.g., in-situ sintering of paste as the paste is printed) or any conductive material that can be made to support itself and maintain a printed shape. Copper and gold are other metals commonly used for such applications.

Figure 5:
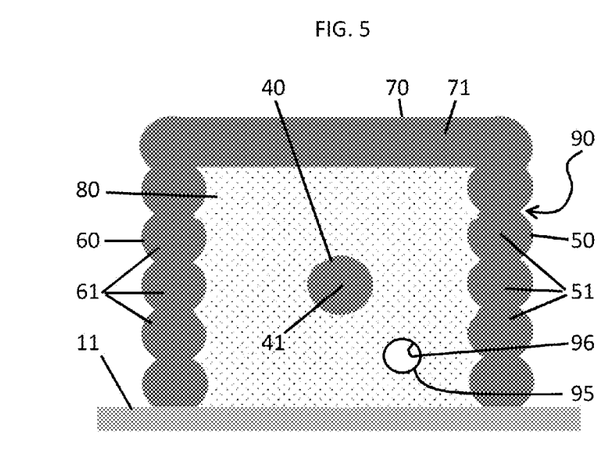
FIG. 5 is a cross-sectional view of the transmission line assembly taken along line 5-5 in FIG. 1.
Figure 6:
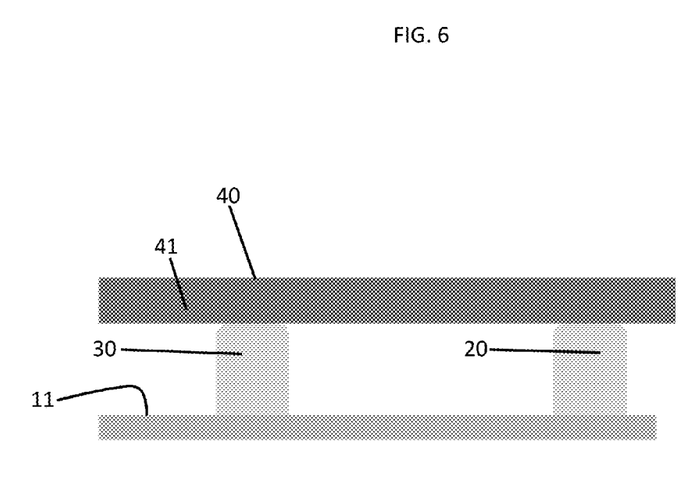
FIG. 6 is a side view of the center conductor of the transmission line assembly of FIG. 1.

The transmission line assembly 10 may, but is not required to, further include a first ground wall 50 (see FIGS. 1, 1A and 5), a second ground wall 60 (see FIGS. 1, 1A and 5), a lid 70 (see FIGS. 1 and 5) and, in some cases, a dielectric material 80 (see FIG. 5). The dielectric material 80 may be air or another dielectric material and is disposed to surround the center conductor 40 and to occupy the space between the center conductor 40 and the first and second ground walls 50 and 60 as well as the space between the center conductor 40 and the lid 70. The dielectric material 80 may alternatively be formed of dielectric material for increased thermal conductivity as compared with air or to effectuate a slow-wave effect. In accordance with embodiments, the ground plane surface 11, the first and second ground walls 50 and 60 and the lid 70 cooperatively form a rectangular cross-section.

The first ground wall 50 is disposed on a first side 501 (see FIG. 1) of the center conductor 40 and includes stacked lines 51 (see FIGS. 1 and 5) of printed metallic paste material. Since the first ground wall 50 includes the stacked lines 51, the metallic material need not be self-supporting. However, in accordance with embodiments, the stacked lines 51 may be formed of similar materials of those of the line 41 of the center conductor 40. The second ground wall 60 is disposed on a second side 601 (see FIG. 1) of the center conductor 40, which is opposite the first side 501, and includes stacked lines 61 (see FIGS. 1 and 5) of printed metallic material. As above, since the second ground wall 60 includes the stacked lines 61, the metallic material need not be self-supporting. However, in accordance with embodiments, the stacked lines 61 may be formed of similar materials of those of the line 41 of the center conductor 40.

Figure 3:
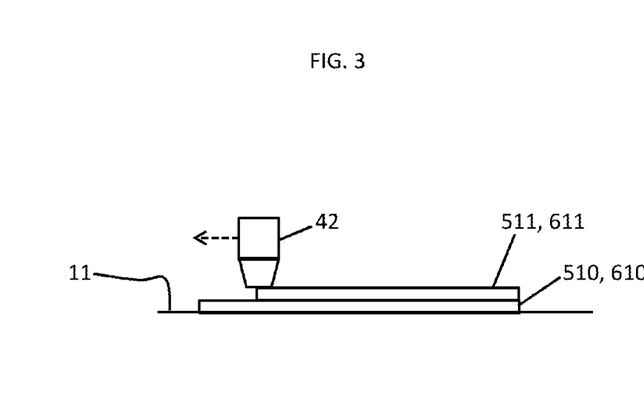
FIG. 3 is a side schematic illustration of a printing of metallic material in accordance with embodiments.

As shown in FIG. 3, the first and second ground walls 50 and 60 may but do not need to extend along the ground plane surface 11 between at least the first and second transition pads 20 and 30. In accordance with embodiments, the first and second ground walls 50 and 60 may be oriented such that the lines 51 and 61 are substantially parallel with the line 41.

In this condition, a lowermost line 510 of the first ground wall 50 may be formed by a three-dimensional printing or additive manufacturing method whereby the metallic material is printed onto the ground plane surface 11 in small quantities from the nozzle 42 while moving along the ground plane surface 11. The second lowermost surface 511 of the first ground wall 50 may then be formed by a similar three-dimensional printing or additive manufacturing method whereby the metallic material is printed in small quantities from the nozzle 42 onto an uppermost surface of the lowermost line 510 while the nozzle 42 moves along the uppermost surface.

In a similar manner, a lowermost line 610 of the second ground wall 60 may be formed by a three-dimensional printing or additive manufacturing method whereby the metallic material is printed onto the ground plane surface 11 in small quantities from the nozzle 42 while moving along the ground plane surface 11. The second lowermost surface 611 of the second ground wall 60 may then be formed by a similar three-dimensional printing or additive manufacturing method whereby the metallic material is printed in small quantities from the nozzle 42 onto an uppermost surface of the lowermost line 610 while the nozzle 42 moves along the uppermost surface.

Additional lines 512 (see FIG. 4) of the first ground wall 50 and additional lines 612 (see FIG. 4) of the second ground wall 60 may be formed in like fashion until the first and second ground walls 50 and 60 are respectively completed. As shown in FIGS. 1 and 5, the first and second ground walls 50 and 60 may be completed when the first and second ground walls 50 and 60 are approximately twice as tall as a height of the center conductor 40 to achieve equal spacing from the outer edge of the center conductor 40 to the lid 70 above and the ground plane surface 11 below. This equal distance is desirable but not necessary. Likewise equal spacing will be maintained between the outer edge of the center conductor 40 and the first and second ground walls 50 and 60 on the left and right sides. This equal distance is also desirable but not necessary.

The lid 70 is suspended above the center conductor 40 and extends between the first and second ground walls 40 and 50. The suspension of the lid 70 is facilitated by the lid 70 being formed as an array of lines 71 (see FIGS. 1, 4 and 5) of printed, self-supporting metallic material. That is, lid 70 may be formed by a three-dimensional printing or additive manufacturing method whereby the metallic material is printed in small quantities from the nozzle 42 while the nozzle repeatedly moves from the first ground wall 50 to the second ground wall 60 or while the nozzle repeatedly moves from the first ground wall 50 to the second ground wall 60 and vice versa.

In accordance with embodiments, the metallic material may be formed of silver and/or silver alloys. With such composition, as the metallic material is printed by the nozzle 42 onto an uppermost line 513 of the first ground wall 50 (or onto an uppermost line 613 (see FIG. 4) of the second ground wall 60) and the nozzle 42 continues the dispensation while moving toward the second ground wall 60 (or the first ground wall 50), as shown in FIG. 4, the metallic material remains suspended above the center conductor 40.

Figure 4:
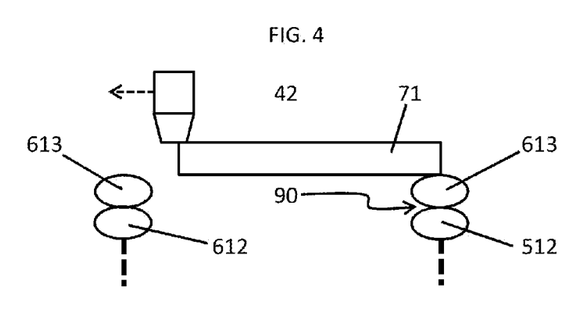
FIG. 4 is a side schematic illustration of a printing of metallic material in accordance with embodiments.

As shown in FIG. 4, the lid 70 extends above the center conductor 40 between the first and second ground walls 50 and 60. In accordance with embodiments, the lid 70 may be oriented such that the lines 71 are substantially perpendicular with the line 41.

As shown in at least FIGS. 1, 4 and 5, the lines 41, 51, 61 and 71 may have circular or, more generally, elliptical cross-sections. In particular, the lines 51 of the first ground wall 50 may be printed with circular cross-sections but then may be deformed into an elliptical shape by the weight of the lines 51 they respectively support. Similarly, the lines 61 of the second ground wall 60 may be printed with circular cross-sections but then may be deformed into an elliptical shape by the weight of the lines 61 they respectively support. The lines 41 and 71 of the center conductor 40 and the lid 70, respectively, may also be printed with circular cross-sections but then may be deformed by gravity. In any case, while all of the lines 41, 51, 61 and 71 may be at least slightly elliptical, a degree of eccentricity of each individual line 41, 51, 61 and 71 may be unique.

With all of the lines 41, 51, 61 and 71 being circular or at least slightly elliptical, adjacent line pairs may form tangential interfaces 90. For example, in the first ground wall 50, each line 51 forms with the one or both of the adjacent lines 51 it abuts with opposite tangential interfaces 90 (see FIGS. 4 and 5) whose respective mid-planes are parallel with the ground plane surface 11. Similarly, in the second ground wall 60, each line 61 forms with the one or both of the adjacent lines 61 it abuts with opposite tangential interfaces 90 whose respective mid-planes are parallel with the ground plane surface 11. For the lid 70, each line 71 may also form with the one or both of the adjacent lines 71 it abuts with opposite tangential interfaces 90 (see FIG. 1) whose respective mid-planes are perpendicular with the ground plane surface 11.

In accordance with further embodiments, the transmission line assembly 10 may include a cooling channel 95 (see FIG. 5). Especially in the case of the dielectric material 80 being formed of dielectric that is three-dimensionally printed or additively manufactured, the cooling channel 95 may run along a length of the center conductor 40 or, in some cases, transverse relative to the center conductor 40. In any case, the cooling channel 95 may include sidewalls 96 (see FIG. 5) configured to define a channel space through which coolant can be directed from a first end of the transmission line assembly 10 to a second end of the transmission line assembly 10.

Figure 7:
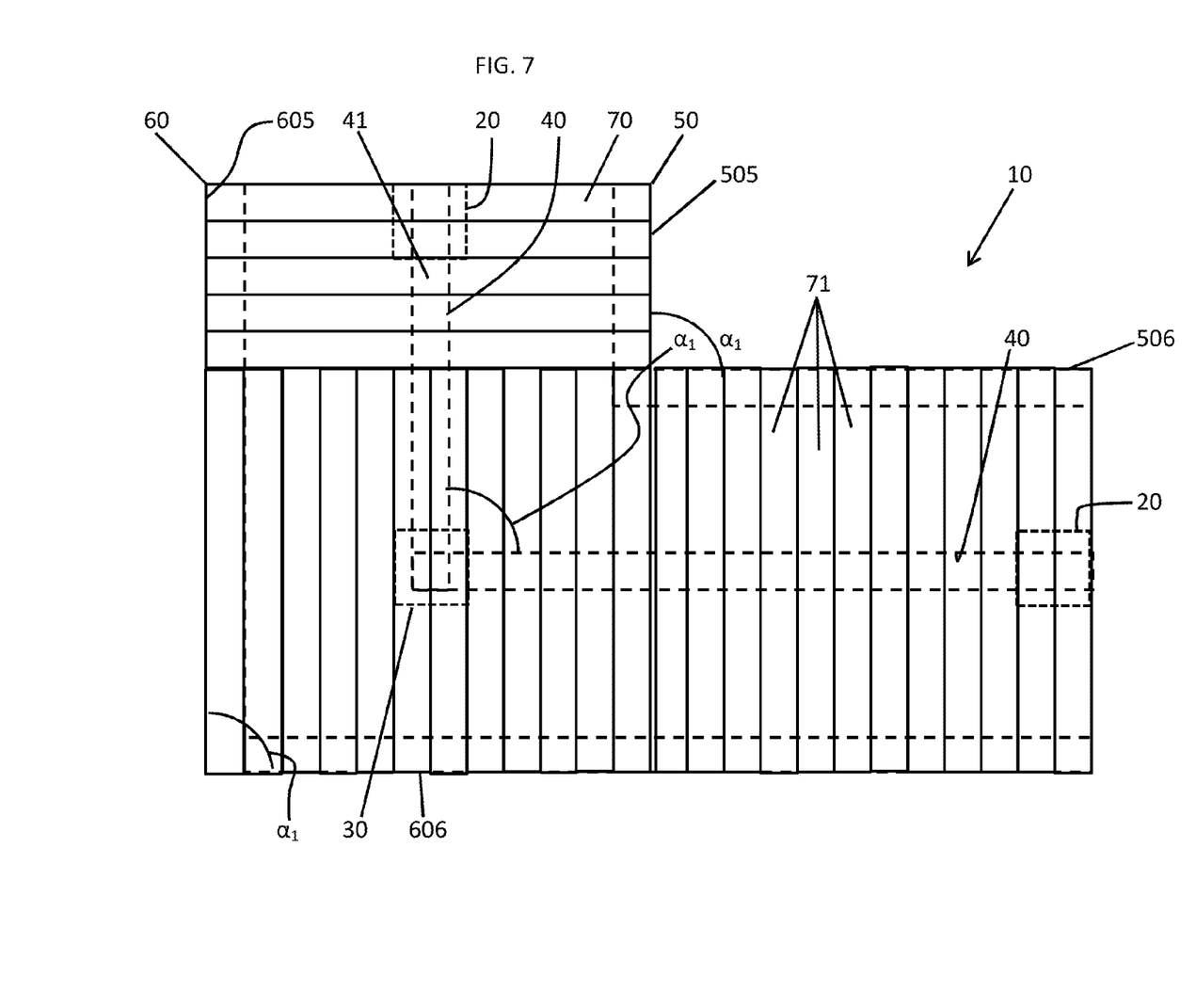
FIG. 7 is a top down view of a further embodiment of a transmission line assembly.
Figure 8:
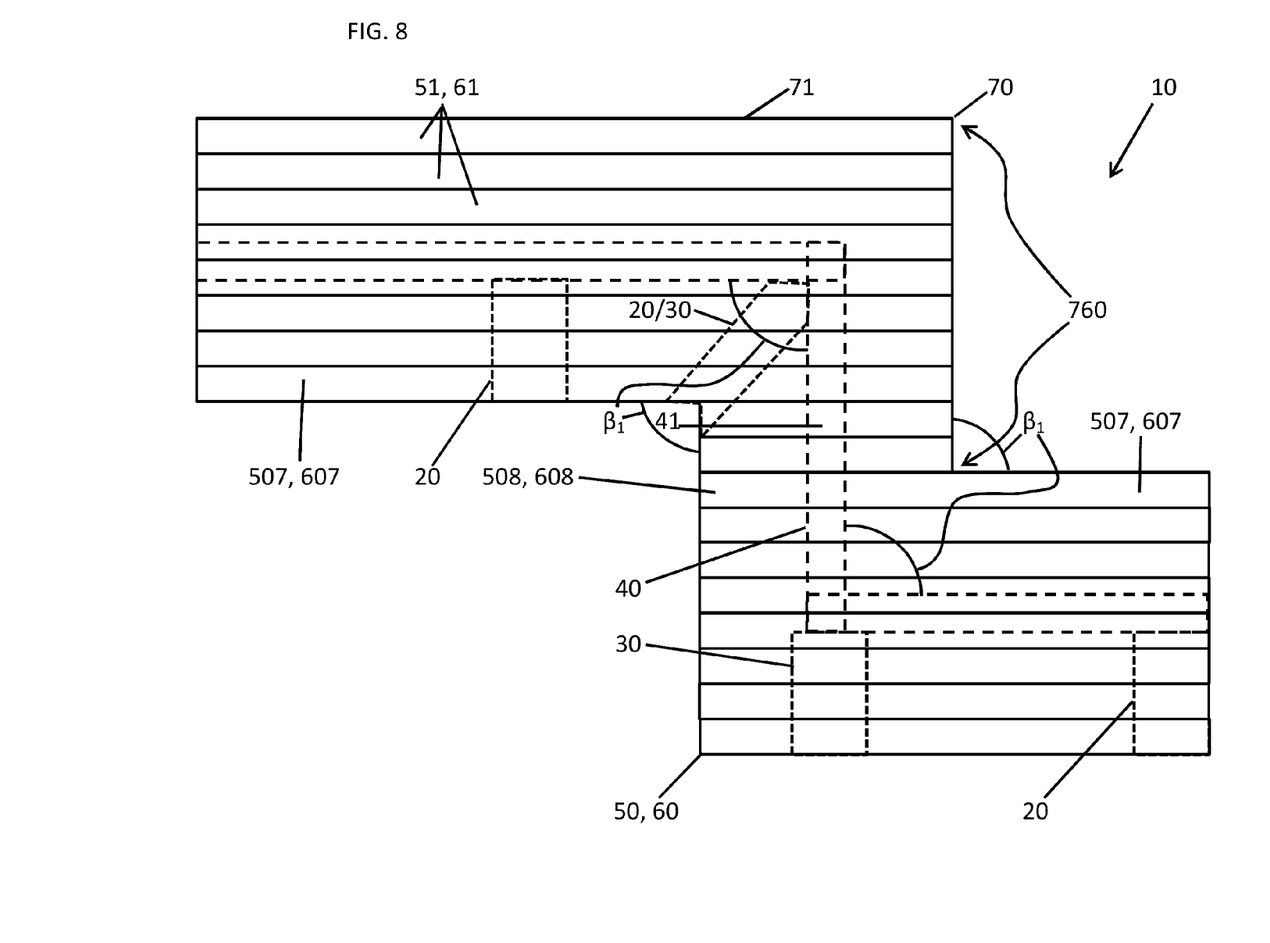
FIG. 8 is a side view of a further embodiment of a transmission line assembly.

While the transmission line assembly 10 illustrated in FIGS. 1 and 1A has a rectangular cross-sectional shape with the center conductor 40 being substantially straight and the first and second ground walls 50 and 60 and the lid 70 being correspondingly substantially straight, it is to be understood that the transmission line assembly 10 may have further more complex shapes. With reference to FIGS. 7 and 8, these complex shapes may include horizontal directional changes (see FIG. 7), whereby the center conductor 40 forms an angle in a plane parallel to a plane of the ground plane surface, and vertical directional changes (see FIG. 8), whereby the center conductor 40 runs in parallel with the plane of the ground plane surface 11 (see FIGS. 1, 1A, 2, 3, 5 and 6) and perpendicularly with respect to the plane of the ground plane surface 11.

As shown in FIG. 7, the transmission line assembly 10 may be formed with one or more horizontal directional changes such that the center conductor 40 forms at least a horizontal angle $\alpha_1$ along line 41 between a first (horizontal in the illustration) segment of line 41 between the first and second transition pads 20 and 30 and a second (vertical in the illustration) segment of line 41 between the second and first transition pads 30 and 20. In this case, a first portion 505 of the first ground wall 50 forms horizontal angle $\alpha_1$ with a second portion 506 of the first ground wall 50 and a first portion 605 of the second ground wall 60 forms horizontal angle $\alpha_1$ with a second portion 606 of the second ground wall 60. At each of the horizontal directional changes, the lines 71 of the lid 70 may be formed whereby the angling of the center conductor 40, the first ground wall 50 and the second ground wall 60 is actuated in the lid 70.

As shown in FIG. 8, the transmission line assembly 10 may be formed with one or more vertical directional changes such that the center conductor 40 forms at least opposed vertical angles $\pm\beta_1$ along line 41 between a first (horizontal in the illustration) segment of line 41 between the first and second transition pads 20 and 30 and second (vertical in the illustration) and third (horizontal in the illustration) sequential segments of line 41 between the second and first transition pads 30 and 20. In this case, stacked lines 51 of first and third portions 507 of the first ground wall 50 respectively form opposed vertical angles $\pm\beta_1$ with stacked lines 51 of a second portion 508 of the first ground wall 50 and stacked lines 61 of first and third portions 607 of the second ground wall 60 respectively form opposed vertical angles $\beta_1$ with stacked lines 61 of a second portion 608 of the second ground wall 60. At each of the vertical directional changes, the lines 71 of the lid 70 may be formed in a step-wise arrangement 760 or another suitable arrangement whereby the angling of the center conductor 40, the first ground wall 50 and the second ground wall 60 is actuated in the lid 70.

In any case, whether the transmission line assembly 10 is formed with simple or complex geometry, at least one or more of the center conductor 40, the first ground wall 50, the second ground wall 60 and the lid 70 may be formed by way of the three-dimensional printing or the additive manufacturing methods, as described above.

With the structures and methods described above, it is possible to print long spans of unsupported metal material to enable the printing of low-cost air-dielectric transmission lines directly into RF systems for optimal RF performance (low RF loss, broad band performance) with or without corresponding ground cages. Most conventional methods require the printed metal to be supported as it is printed or otherwise require expensive and wasteful subtractive processes. The structures and methods also enable compact, low-loss crossover constructions in which one transmission line crosses over another in potentially increasingly complex overall RF systems.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the embodiment to the invention has been described, it will be understood that those skilled in the art, both now and in the future, may make various improvements and enhancements which fall within the scope of the claims which follow. These claims should be construed to maintain the proper protection for the invention first described.

The invention claimed is:

1. A transmission line, comprising:
    a center conductor suspended above a ground plane and comprising a line of printed, self-supporting metallic material;
    ground walls disposed on either side of the center conductor and comprising stacked lines of printed metallic material; and
    a lid suspended above the center conductor between the ground walls and comprising arrayed lines of the printed, self-supporting metallic material.

2. The transmission line according to claim 1, further comprising a dielectric material disposed about the center conductor.

3. The transmission line according to claim 2, further comprising a cooling channel defined through the dielectric material.

4. The transmission line according to claim 1, wherein the center conductor extends between first and second removable supports.

5. The transmission line according to claim 4, wherein the first and second removable supports comprise a dielectric material.

6. The transmission line according to claim 4, wherein the first and second removable supports are separated by about 50-100 mils.

7. The transmission line according to claim 1, wherein the printed, self-supporting material comprises silver.

8. The transmission line according to claim 1, wherein the line of printed, self-supporting metallic material, the stacked lines and the arrayed lines have elliptical cross-sections.

9. The transmission line according to claim 1, wherein the ground plane, the ground walls and the lid form a rectangular cross-section.

10. The transmission line according to claim 1, wherein adjacent ones of the stacked lines form tangential interfaces.

11. The transmission line according to claim 1, wherein:
    the stacked lines of the ground walls are substantially parallel with the center conductor; and
    the arrayed lines of the lid are substantially perpendicular with respect to the center conductor.

12. The transmission line according to claim 1, wherein the center conductor, the first and second ground walls and the lid are configured to form at least one or more of horizontal or vertical directional changes.

13. A transmission line formation method, comprising:
    suspending a first line of self-supporting metallic material (SSMM) above a ground plane;
    laying first and second lines of grounded metallic material (GMM) along the ground plane on either side of the first line;
    forming ground walls by laying additional lines of metallic material (AMM) on the first and second lines of the GMM and on previously laid lines of the AMM; and
    forming a lid by suspending second lines of the SSMM above a plane of the first line of the SSMM.

14. The transmission line formation method according to claim 13, wherein at least one or more of the SSMM, the GMM and the AMM comprise silver.

15. The transmission line formation method according to claim 13, wherein:
    the first and second lines of the GMM and the lines of the AMM extend in parallel with the first line of the SSMM, and
    the second lines of the SSMM extend perpendicularly with respect to the first lines of the SSMM.

16. The transmission line formation method according to claim 13, wherein the second lines of the SSMM extend between respective uppermost lines of the AMM.

17. The transmission line formation method according to claim 13, wherein the first line of the SSMM extends between first and second removable supports.

18. The transmission line formation method according to claim 13, further comprising disposing a dielectric material about the first line of the SSMM.

19. A transmission line formation method, comprising:
    printing a first line of self-supporting metallic material (SSMM) above a ground plane between first and second removable supports;
    printing first and second lines of grounded metallic material (GMM) along the ground plane on either side of the first line of the SSMM;
    sequentially forming ground walls by printing lines of additional metallic material (AMM) on the first and second lines of the GMM and on previously printed lines of the AMM in a stacking direction; and
    sequentially forming a lid by printing second lines of the SSMM above a plane of the first line of the SSMM between respective uppermost lines of the AMM of the ground walls.

20. The transmission line formation method according to claim 19, further comprising disposing a dielectric material about the first line of the SSMM.

\* \* \* \* \*